United States Patent
Yan et al.

(10) Patent No.: US 12,432,744 B2
(45) Date of Patent: Sep. 30, 2025

(54) EMTC SCHEDULING AND MPDCCH MONITORING

(71) Applicant: Lenovo (Beijing) Ltd., Beijing (CN)

(72) Inventors: Zhi Yan, Beijing (CN); Hongmei Liu, Beijing (CN); Yuantao Zhang, Beijing (CN); Yingying Li, Beijing (CN); Haiming Wang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 455 days.

(21) Appl. No.: 17/920,604

(22) PCT Filed: Apr. 30, 2020

(86) PCT No.: PCT/CN2020/088345
§ 371 (c)(1),
(2) Date: Oct. 21, 2022

(87) PCT Pub. No.: WO2021/217598
PCT Pub. Date: Nov. 4, 2021

(65) Prior Publication Data
US 2023/0247639 A1    Aug. 3, 2023

(51) Int. Cl.
*H04W 72/23* (2023.01)
*H04W 72/1268* (2023.01)
*H04W 72/1273* (2023.01)

(52) U.S. Cl.
CPC ....... *H04W 72/23* (2023.01); *H04W 72/1268* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 12,069,764 B2 * | 8/2024 | Nimbalker | H04W 52/0229 |
| 2017/0331577 A1 * | 11/2017 | Parkvall | H04L 27/2602 |
| 2018/0092073 A1 | 3/2018 | Nogami et al. | |
| 2018/0123744 A1 | 5/2018 | Nogami et al. | |
| 2019/0123992 A1 * | 4/2019 | Ly | H04W 24/10 |
| 2024/0430762 A1 * | 12/2024 | Hsieh | H04W 36/0088 |

FOREIGN PATENT DOCUMENTS

| | | | | |
|---|---|---|---|---|
| CN | 104767592 A | * | 7/2015 | H04B 7/0632 |
| CN | 107734551 A | * | 2/2018 | H04W 72/535 |
| CN | 104620516 B | * | 5/2018 | H04J 11/0093 |
| CN | 111727658 A | * | 9/2020 | H04W 74/0833 |

(Continued)

OTHER PUBLICATIONS

OPPO, "NTN control procedure for physical layer," 3GPP TSG RAN WG1 #98bis, Chongqing, China, Oct. 14-20, 2019, R1-1910386.*

(Continued)

*Primary Examiner* — Andrew C Oh
(74) *Attorney, Agent, or Firm* — FIG. 1 Patents (57) ABSTRACT

Methods and apparatuses for eMTC scheduling are disclosed. A method comprises receiving a control signal in a search space; and transmitting an uplink data after a first time duration of receiving the control signal or of receiving a downlink signal scheduled by the control signal, wherein the first time duration is comprised of at least one of a second time duration and a time duration offset ($K_{offset}$).

20 Claims, 10 Drawing Sheets

(56) References Cited

FOREIGN PATENT DOCUMENTS

| | | | | |
|---|---|---|---|---|
| CN | 112564751 A | * | 3/2021 | ............ H04W 72/23 |
| CN | 112788732 A | * | 5/2021 | ........ H04W 56/0045 |
| CN | 113141659 A | * | 7/2021 | ............ H04W 72/23 |
| CN | 113347729 A | * | 9/2021 | ............ H04W 72/21 |
| CN | 111510954 B | * | 12/2021 | ......... H04W 72/535 |
| CN | 114946234 A | * | 8/2022 | ............ H04W 68/02 |
| EP | 3678408 A1 | * | 7/2020 | .............. H04L 5/001 |
| EP | 4080952 A1 | * | 11/2020 | ............ H04W 68/02 |
| EP | 3772228 A1 | * | 2/2021 | ............ H04W 72/23 |
| EP | 3800942 A1 | * | 4/2021 | ............ H04W 52/02 |
| WO | WO-2014070602 A1 | * | 5/2014 | ......... H04W 72/563 |
| WO | WO-2016197899 A1 | * | 12/2016 | ........... H04L 5/0098 |
| WO | WO-2017014600 A1 | * | 1/2017 | ........... H04L 5/0092 |
| WO | WO-2018014360 A1 | * | 1/2018 | ............ H04W 72/23 |
| WO | WO-2018104866 A1 | * | 6/2018 | .............. H04L 5/005 |
| WO | 2019027308 A1 | | 2/2019 | |
| WO | WO-2019047573 A1 | * | 3/2019 | ............ H04W 72/23 |
| WO | WO-2020071698 A1 | * | 4/2020 | ............ H04W 56/00 |
| WO | WO-2021062584 A1 | * | 4/2021 | ............ H04W 48/16 |
| WO | WO-2021070396 A1 | * | 4/2021 | ............ H04W 72/04 |
| WO | WO-2021164762 A1 | * | 8/2021 | ........ H04W 52/0229 |
| WO | WO-2021174411 A1 | * | 9/2021 | |

OTHER PUBLICATIONS

3GPP TS 36.211 V16.1.0 (Mar. 2020) Technical Specification 3rd Generation Partnership Project; Technical Specification Group Radio Access Network; Evolved Universal Terrestrial Radio Access (E-UTRA); Physical channels and modulation (Release 16).*

CMCC , "Discussion on UL transmission timing for NTN", 3GPP TSG RAN WG1 #99, R1-1912535, Reno, USA [retrieved Oct. 26, 2022]. Retrieved from the Internet <https://www.3gpp.org/ftp/tsg_ran/WG1_RL1/TSGR1_99/Docs>., Nov. 2019, 3 Pages.

Ericsson , "TP for Section 6.2 in TR 38.821 on NTN PHY control procedures", 3GPP TSG-RAN WG1 Meeting #99, R1-1913402, Reno, USA [retrieved Oct. 26, 2022]. Retrieved from the Internet <https://www.3gpp.org/ftp/tsg_ran/WG1_RL1/TSGR1_99/Docs>., Nov. 2019, 8 Pages.

Huawei , "Discussion on 2-step RACH procedure", 3GPP TSG RAN WG1 Meeting #98bis, R1-1910032, Chongqing, China [retrieved Oct. 26, 2022]. Retrieved from the Internet <https://www.3gpp.org/ftp/TSG_RAN/WG1_RL1/TSGR1_98b/Docs/>., Oct. 2019, 12 Pages.

Intel Corporation , "On physical layer control procedures for NTN", 3GPP TSG RAN WG1 #98-Bis, R1-1910657, Chongqing, China [retrieved Oct. 26, 2022]. Retrieved from the Internet <https://www.3gpp.org/ftp/tsg_ran/WG1_RL1/TSGR1_98b/Docs>., Oct. 2019, 3 Pages.

OPPO , "NTN control procedure for physical layer", 3GPP TSG RAN WG1 #98bis, R1-1910386, Chongqing, China [retrieved Oct. 26, 2022]. Retrieved from the Internet <https://www.3gpp.org/ftp/tsg_ran/WG1_RL1/TSGR1_98b/Docs>., Oct. 2019, 3 Pages.

PCT/CN2020/088345 , "International Preliminary Report on Patentability", PCT Application No. PCT/CN2020/088345, Nov. 10, 2022, 5 pages.

PCT/CN2020/088345 , "International Search Report and Written Opinion", PCT Application No. PCT/CN2020/088345, Jan. 29, 2021, 7 pages.

* cited by examiner

| | | U | D | D | D | D | U | U | U | U | D | D | D | D | U | U | U | U | D | D | D | D | U | U | U | U | D | D | D | D | U | U | U |
|---|---|---|---|---|---|---|---|---|---|---|---|---|---|---|---|---|---|---|---|---|---|---|---|---|---|---|---|---|---|---|---|---|---|
| SF# | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| MPDCCH | | | | | | | | | | | | | | | | | | | GR | GR | GR | | | | | | | | | | | | |

| | | U | D | D | D | D | U | U | U | U | D | D | D | D | U | U | U | U | D | D | D | D | U | U | U | U | D | D | D | D | U | U | U |
|---|---|---|---|---|---|---|---|---|---|---|---|---|---|---|---|---|---|---|---|---|---|---|---|---|---|---|---|---|---|---|---|---|---|
| SF# | | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| MPDCCH | | GR | GR | GR | | | | | | | | | | | | | | | GR | GR | | | | | | | | | | | | | |

| | | U | D | D | D | D | U | U | U | U | D | D | D | D | U | U | U | U | D | D | D | D | U | U | U | U | D | D | D | D | U | U | U |
|---|---|---|---|---|---|---|---|---|---|---|---|---|---|---|---|---|---|---|---|---|---|---|---|---|---|---|---|---|---|---|---|---|---|
| SF# | | 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
| MPDCCH | | | | | | | | | | | | | | | | | | | | | | | | | | | | | | | | | |

| | | U | D | D | D | D | U | U | U | U | D | D | D | D | U | U | U | U | D | D | D | D | U | U | U | U | D | D | D | D | U | U | U |
|---|---|---|---|---|---|---|---|---|---|---|---|---|---|---|---|---|---|---|---|---|---|---|---|---|---|---|---|---|---|---|---|---|---|
| SF# | | 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 |
| MPDCCH | | | | | | | | | | | | | | | | | | | | | | | | | | | | | | | | | |

EMTC SCHEDULING AND MPDCCH MONITORING

FIELD

The subject matter disclosed herein generally relates to wireless communications, and more particularly relates to methods and apparatuses for eMTC scheduling enhancement and MPDCCH monitoring optimization in non-terrestrial network (NTN).

BACKGROUND

The following abbreviations are herewith defined, at least some of which are referred to within the following description: Third Generation Partnership Project (3GPP), New Radio (NR), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Physical Downlink Control Channel (PDCCH), Downlink control information (DCI), single DCI (S-DCI), non-terrestrial networks (NTN), terrestrial network (TN), Transport Block (TB), Internet-of-Things (IoT), Narrowband Internet-of-Things (NB-IoT or NBIoT), NBIoT PUSCH (NPUSCH), NBIoT PDCSH (NPDSCH), NBIoT PDCCH (NPDCCH), Machine-Type Communication (MTC), enhanced Machine Type Communication (eMTC), MTC PDCCH (MPDCCH), receiver and transmitter distance (RTD), Hybrid Automatic Repeat reQuest (HARQ), Geostationary Earth Orbit (GEO), Low Earth orbit (LEO), New Data Indicator (NDI).

Figure 1:
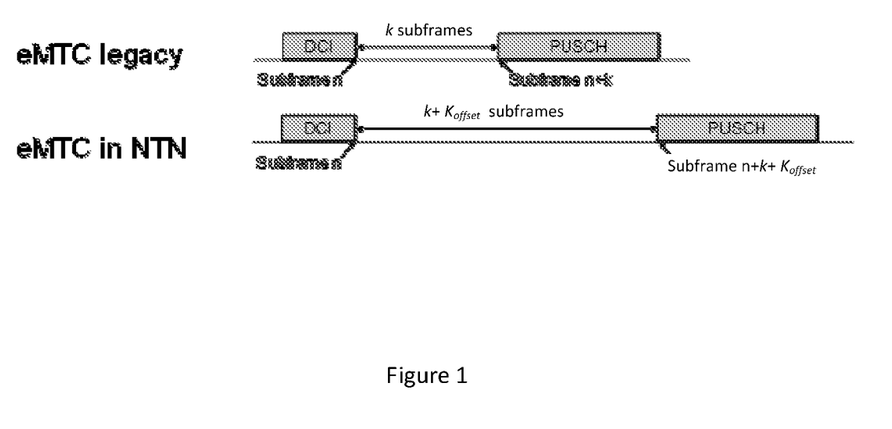
FIG. 1 illustrates eMTC uplink scheduling in legacy and in NTN.

As shown in FIG. 1, in condition of eMTC legacy, when a UE receives a DCI scheduling a PUSCH uplink transmission on MPDCCH at subframe n, the PUSCH uplink transmission is scheduled at subframe n+k, wherein k is set 4 for FDD. For TDD, k is determined by TDD UL/DL configuration shown as the TDD UL/DL configuration table:

TABLE 8-2

| TDD UL/DL | k for TDD configurations 0-6 |
|---|---|
| | subframe number n |
| Configuration | 0  1  2  3  4  5  6  7  8  9 |

| TDD UL/DL Configuration | 0 | 1 | 2 | 3 | 4 | 5 | 6 | 7 | 8 | 9 |
|---|---|---|---|---|---|---|---|---|---|---|
| 0 | 4 | 6 |   |   | 4 | 6 |   |   |   |   |
| 1 |   | 6 |   | 4 |   | 6 |   |   |   | 4 |
| 2 |   |   |   | 4 |   |   |   |   | 4 |   |

TABLE 8-2-continued

| TDD UL/DL | k for TDD configurations 0-6 |
|---|---|
| | subframe number n |
| Configuration | 0  1  2  3  4  5  6  7  8  9 |

| TDD UL/DL Configuration | 0 | 1 | 2 | 3 | 4 | 5 | 6 | 7 | 8 | 9 |
|---|---|---|---|---|---|---|---|---|---|---|
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

In condition of eMTC in NTN, due to long receiver and transmitter distance (RTD), a timing offset $K_{offset}$ is introduced to modify the timing relationship. $K_{offset}$ is related to the round trip distance between the UE and the eNB and process timing at the eNB or UE side. $K_{offset}$ can be configured in SIB or RRC signaling. If the UE has its location information, the UE can calculate the round trip distance between the eNB and and UE by itself and further derive the $K_{offset}$ value by itself. The value of the $K_{offset}$ may be determined by types of satellites. For example, if the eNB is on LEO, $K_{offset}$ can be tens of milliseconds, while if the eNB is on GEO, $K_{offset}$ can be hundreds of milliseconds.

As shown in FIG. 1, in condition of eMTC in NTN, when a UE receives a DCI scheduling a PUSCH uplink transmission on MPDCCH at subframe n, the PUSCH uplink transmission is scheduled at subframe $n+k+K_{offset}$, wherein k is set 4 for FDD. For TDD, k is determined by the above TDD UL/DL configuration table. $K_{offset}$ is determined by any of the above-describe methods.

Figure 2:
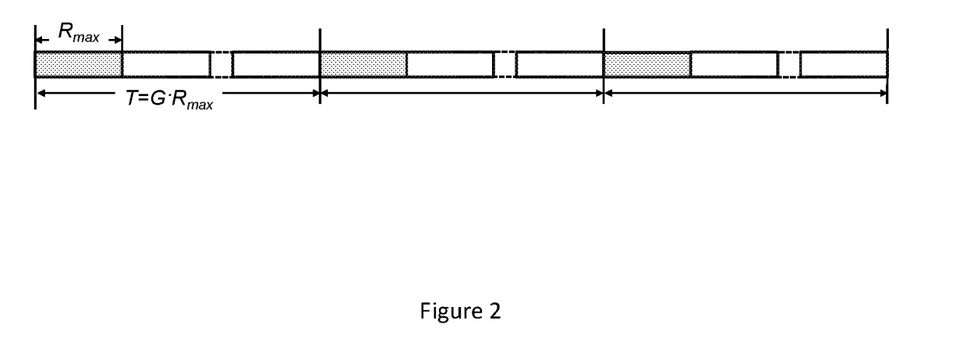
FIG. 2 illustrates an example of legacy MPDCCH search space.

For eMTC, as shown in FIG. 2, the MPDCCH search space is periodic. The MPDCCH search space period is $T=G*R_{max}$, in which G is determined by higher layer, $R_{max}$ is the maximum number of MPDCCH repetition configured by higher layer. For example, for CE mode A UE-specific search space, G is configured from the set {1, 1.5, 2, 2.5, 4, 5, 8, 10}; and $R_{max}$ is configured from the set {1, 2, . . . , 256}.

If configured, there is one maximal MPDCCH monitoring duration (with a length of $R_{max}$) for UE-specific search space every $T=G \cdot R_{max}$ period. That is, there is one maximal MPDCCH monitoring duration ($R_{max}$) in each MPDCCH search space period ($T=G \cdot R_{max}$). The UE only monitors the maximal $R_{max}$ duration for DCI while the UE is unnecessary to monitor the remaining (G−1) $R_{max}$ duration for DCI in each MPDCCH search space period ($T=G \cdot R_{max}$). In FIG. 2, the $R_{max}$ duration in shadow is located at the beginning of the MPDCCH search space period (T). Alternatively, the starting subframe #$k_0$ of the $R_{max}$ duration can be an offset (e.g. $\alpha_{offset}*T$) from the beginning of each MPDCCH search space period ($T=G \cdot R_{max}$).

Figure 3:
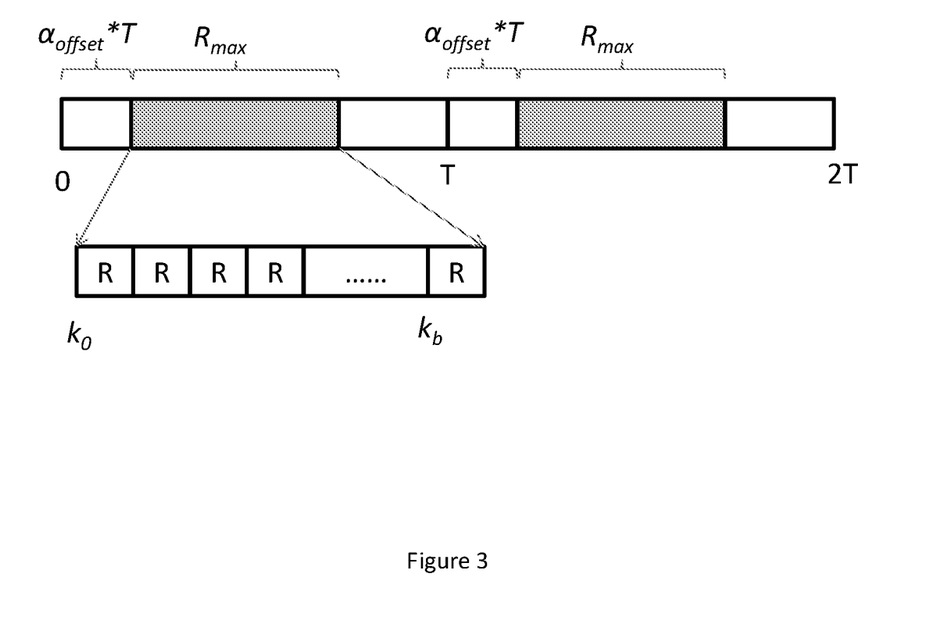
FIG. 3 illustrates an example of the locations of the starting subframe k of each $R_{max}$ duration.

FIG. 3 illustrates an example of the locations of the starting subframe k of each MPDCCH monitoring duration ($R_{max}$). That is, for each MPDCCH search space period (T), the locations of the starting subframe k of each MPDCCH monitoring duration ($R_{max}$) are given by $k=k_b$, where $k_b$ is the $b^{th}$ consecutive DL subframe from subframe $k_0$, excluding subframes used for transmission of SI messages, and $b=u \cdot R$, and $$u = 0, 1, \ldots \frac{R_{max}}{R} - 1,$$

R is the MPDCCH repetition number for blind detection, and where subframe $k_0$ is a subframe satisfying the condition $(10n_f + \lfloor n_s/2 \rfloor) \mod T = \lfloor \alpha_{offset} \cdot T \rfloor$, where $T = G \cdot R_{max}$, $T \geq 4$.

The timing offset $K_{offset}$ introduced in eMTC in NTN has an impact on the MPDCCH search space period (T). A RTD duration can be configured or assumed to be $2K_{offset}+8$, that is twice of $K_{offset}+4$ which includes the transmission delay and processing delay at eNB or UE side.

The maximal HARQ process is 8 for NTN eMTC uplink transmission. Therefore, during the RTD duration (e.g. $2K_{offset}+8$), it is not necessary to monitor the MPDCCH for DCI scheduling uplink transmission if the scheduling TB is up to 8 within the RTD duration.

In MPDCCH search space, the detected DCI for uplink transmission is determined by eNB scheduling. For example, in one MPDCCH search space period, if $R_{max}$ is configured as 4, up to 4 uplink transmissions can be scheduled by DCI with each DCI repetition number R equal to 1. If the maximal HARQ process number is 8, two MPDCCH search space periods are enough to schedule up to 8 uplink transmissions for the extreme case. However, there are more than 2 MPDCCH search space periods in the RTD duration, especially for GEO case. So, there is no HARQ process number available for uplink transmission after two MPDCCH search space periods. It is necessary to redesign the search space for eMTC in NTN.

This disclosure targets for eMTC scheduling enhancement and MPDCCH monitoring optimization in non-terrestrial network.

BRIEF SUMMARY

Methods and apparatuses for eMTC scheduling are disclosed.

In one embodiment, a method comprises receiving a control signal in a search space; and transmitting an uplink data after a first time duration of receiving the control signal or of receiving a downlink signal scheduled by the control signal, wherein the first time duration is comprised of at least one of a second time duration and a time duration offset ($K_{offset}$).

In one embodiment, the time duration offset is multiple of 10 ms or 40 ms. Alternatively, the time duration offset is determined by a valid subframe pattern. The time duration offset may be determined by a valid subframe pattern or configured from an offset set determined by a valid subframe pattern.

In another embodiment, the search space is configured by a scaling factor ($G_0$) and a maximum number ($R_{max}$), the scaling factor is determined by at least one of the time duration offset ($K_{offset}$), the maximal number ($R_{max}$), a preconfigured number, a type of satellite.

In some embodiment, the method further comprises monitoring the control signal from a starting time slot, the starting time slot is determined by at least one of a first offset ($\Delta*T$) in a first period ($T_0$) and a second offset ($\alpha_{offset}*T$) in a second period (T). In particular, the first offset ($\Delta*T$) may be configured by high layer with unit of the second period (T). The first period ($T_0$) may be configured by high layer with unit of the second period. The first period ($T_0$) may alternatively determined by a first number (M) and the second period (T), wherein, the first number (M) is configured by higher layer signaling. In some embodiment, the first offset ($\Delta*T$) is determined by a second number ($\Delta$) and the second period (T), wherein, the second number ($\Delta$) is configured by higher layer signaling. The first period ($T_0$) may be determined by the time duration offset ($K_{offset}$). In some embodi-
ment, the search space includes a search window (N*T) in the first period ($T_0$). In particular, the search window is configured by high layer with unit of the second period (T). In some embodiment, the search space is from the starting time slot to an end time slot, wherein the end time slot is determined according to at least one of a control signal indication and a third number of the control signal having been received. In particular, the control signal indication includes at least one of one bit indication in the control signal, one unused states indication of the control signal, HARQ process number in the control signal being equal to a predefined value and NDI in the control signal being toggled in the first period.

In another embodiment, a remote unit comprises a receiver that receives a control signal in a search space; and a transmitter that transmits an uplink data after a first time duration of receiving the control signal or of receiving a downlink signal scheduled by the control signal, wherein the first time duration is comprised of at least one of a second time duration and a time duration offset ($K_{offset}$).

In one embodiment, a method comprises transmitting a control signal in a search space; and receiving an uplink data after a first time duration of transmitting the control signal or of transmitting a downlink signal scheduled by the control signal, wherein the first time duration is comprised of at least one of a second time duration and a time duration offset ($K_{offset}$).

In yet another embodiment, a base unit comprises a transmitter that transmits a control signal in a search space; and a receiver that receives an uplink data after a first time duration of transmitting the control signal or of transmitting a downlink signal scheduled by the control signal, wherein the first time duration is comprised of at least one of a second time duration and a time duration offset ($K_{offset}$).

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, for the transmission timing of DCI scheduled PUSCH, UE transmits the PUSCH in the first uplink subframe after $n+k+K_{offset}$ subframes, in which k is set to 4 for FDD, and is determined by TDD UL/DL configuration shown as the below table for TDD.

TABLE 8-2

| TDD UL/DL | k for TDD configurations 0-6 | | | | | | | | | |
|---|---|---|---|---|---|---|---|---|---|---|
| | subframe number n | | | | | | | | | |
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For eMTC TDD, the scheduling delay k is based on the TDD UL/DL configuration. The scheduling delay k is set in consideration that the subframe #n+k should be uplink subframe. If $K_{offset}$ is configured only according to the satellite type without any restriction, the subframe $\#n+k+K_{offset}$ may not be available for uplink subframe. On the other hand, if the k table is generated based on $\#n+k+K_{offset}$, different k values will be set for different values of $K_{offset}$, which is unfavorable. Therefore, some restriction is necessary to be added to the value of $K_{offset}$ to ensure that the subframe $\#n+k+K_{offset}$ is a subframe for uplink transmission.

The eMTC timing relationship is synchronized timing. That is, when a first subframe (for example, subframe #n+k) is a subframe for uplink transmission, any subframe that is one or more multiples of a period of valid subframe pattern or period of TDD UL/DL configuration (a period of valid subframe pattern is 10 ms or 40 ms) plus the first subframe is also a subframe for uplink transmission.

Therefore, according to a first embodiment, $K_{offset}$ should be configured as a multiple of the period of valid subframe pattern (e.g., 10 ms or 40 ms) or a multiple of a period of TDD UL/DL configuration (e.g., 10 ms). Alternatively, $K_{offset}$ may be configured from a set of values, wherein the values in the set are determined by the period of valid subframe pattern (or the period of TDD UL/DL configuration).

According to a first sub-embodiment of the first embodiment, if the period of valid subframe pattern is 10 ms, $K_{offset}$ is configured as a multiple of 10 ms, and if the period of valid subframe pattern is 40 ms, $K_{offset}$ is configured as a multiple of 40 ms.

According to a second sub-embodiment of the first embodiment, if the system is TDD, $K_{offset}$ is configured as a multiple of 10 ms.

A common delay $K_0$ instead of $K_{offset}$ may be configured by SIB or $K_0$ can be derived or calculated by UE for UE with location information, which is assumed to be a predefined value. According to a third sub-embodiment of the first embodiment, if the common delay $K_0$ is not a multiple of 10 ms or 40 ms, the scheduling delay $K_{offset}$ should be postponed to (configured as) the latest multiple of 10 ms or 40 ms after the common delay $K_0$. In other words, the scheduling delay $K_{offset}$ should be a smallest integer multiple of 10 ms or 40 ms that is equal to or larger than the common delay $K_0$. For example, if the common delay $K_0$ is 398 ms, the scheduling delay $K_{offset}$ should be 400 ms (the latest multiple of 10 ms after the common delay $K_0$ or the smallest integer multiple of 10 ms that is equal to or larger than the common delay $K_0$).

According to a fourth sub-embodiment of the first embodiment, several delay sets are configured to include the possible values of the scheduling delay $K_{offset}$. Each value in each delay set is determined by a period of valid subframe pattern. For example, two delays sets K1={390, 400, 410, 420}, K2={360, 400, 440, 480} may be configured. If the period of valid subframe pattern is 10 ms, $K_{offset}$ is configured from the set K1, each value in which is a multiple of 10 ms; and if the period of valid subframe pattern is 40 ms, $K_{offset}$ is configured from the set K2, each value in which is a multiple of 40 ms.

According to the first embodiment, the value of $K_{offset}$ is configured as a multiple of a period of valid subframe pattern (10 ms or 40 ms), so that the subframe #n+k+$K_{offset}$ is a subframe for uplink transmission. In this manner, the Release 13 eMTC timing relationship can be reused without update. For example, when UE receives a DCI scheduling an uplink data or a downlink signal (with an uplink data for the HARQ-ACK of the downlink data), the UE transmits the uplink data after a first time duration of receiving the DCI or of receiving the downlink signal. The first time duration is comprised of a second time duration (k) and the time duration offset ($K_{offset}$). The k can still be configured as 4 for FDD, and can be still determined by the existing TDD UL/DL configuration table for TDD. Incidentally, when the second time duration (k) is configured along with the time duration offset ($K_{offset}$) (in other words, the first time duration (k+$K_{offset}$) is configured), we can say that the second time duration (k) is 0.

In NTN, due to long receiver and transmitter distance (RTD), it is necessary to redesign the MPDCCH search space period (T=G*$R_{max}$) in the RTD duration. In this disclosure, two different solutions are proposed in the following second and third embodiments.

According to the second embodiment, G is reconfigured to modify the relation T=G*$R_{max}$. In particular, G, which is originally configured from a set of {1, 1.5, 2, 2.5, 4, 5, 8, 10}, is reconfigured as a value $G_0$.

$G_0$ may be determined at least in four alternative ways.

In a first way, $G_0$ may be determined by $K_{offset}$ and $R_{max}$. For example, $G_0$=floor((4+$K_{offset}$)/(4*$R_{max}$)).

In a second way, $G_0$ may be configured by RRC or broadcast signaling.

In a third way, $G_0$=G+$G_{offset}$, wherein $G_{offset}$ is determined by a type of satellite (e.g., LEO, GEO) or configured by higher layer. For example, in condition of LEO, $G_{offset}$=2, while in condition of GEO, $G_{offset}$=4. In particular, G is chosen from the original set of {1, 1.5, 2, 2.5, 4, 5, 8, 10}. The offset $G_{offset}$ is added to the chosen G.

In a fourth way, $G_0$=α*G, wherein α is determined by a type of satellite (e.g., LEO, GEO) or configured by higher layer. For example, in condition of LEO, α=2, while in condition of GEO, α=4. In particular, G is chosen from the original set of {1, 1.5, 2, 2.5, 4, 5, 8, 10}. The chosen G is multiplied by the coefficient α.

When $G_0$ is determined, the MPDCCH search space period (T) is modified to T=$G_0$*$R_{max}$. The number (N) of MPDCCH search space periods in the RTD duration (e.g., 2$K_{offset}$+8) can be calculated.

From another point of view, if the number (N) of MPDCCH search space periods in the RTD duration ($T_{RTD}$, e.g., 2$K_{offset}$+8) is configured, the value $G_0$ can be calculated accordingly. In particular, $G_0$=floor(($T_{RTD}$)/(N*$R_{max}$)).

According to the second embodiment, the MPDCCH search space period (T) is extended by configuring a larger G (i.e. $G_0$). However, the original G is determined by a traffic model. When the G is extended to $G_0$ with a larger value, the traffic model may not be satisfied.

According the third embodiment, the MPDCCH search space period (T) is maintained, while the location of N MPDCCH search space periods is redesigned.

In the third embodiment, a period $T_0$ is introduced. The value $T_0$ is determined by the time duration offset ($K_{offset}$). In particular, $T_0$ is comparable to the RTD duration ($T_{RTD}$, e.g., 2$K_{offset}$+8), and is a multiple of the MPDCCH search space period (T). For example, $T_0$=ceil{($T_{RTD}$)/(G*$R_{max}$)}*(G*$R_{max}$). Alternatively, $T_0$=M*G*$R_{max}$, in which M=ceil{($T_{RTD}$)/(G*$R_{max}$)}.

It can be seen that M is the number of MPDCCH search space periods in the period $T_0$. That is, $T_0$=M*T.

Considering that the necessary number (N) of MPDCCH search space periods monitored by the UE is limited by the maximum HARQ process numbers, M is a number that is definitely considerably larger than N.

Therefore, according to the third embodiment, the UE is expected to monitor N consecutive MPDCCH search space periods (i.e. N*T) in the period $T_0$ ($T_0$=M*T). In particular, the UE may or may not start the monitoring from the first MPDCCH search space period in the period $T_0$. An offset can be configured to indicate the starting MPDCCH search space period. The offset may be configured as a multiple (Δ) of MPDCCH search space period (T), Δ=0, 1, 2, . . . .

That is, in the period $T_0$ ($T_0$=M*T), after an offset (Δ*T), the UE starts to monitor N consecutive MPDCCH search space periods (N*T) for the DCI(s). In addition, in each of the MPDCCH search space periods, the UE only monitors maximal MPDCCH monitoring duration (with a length of $R_{max}$ subframes) for the DCI(s). The start subframe of the MPDCCH monitoring duration in each MPDCCH search space period can be indicated by another offset (e.g. $α_{offset}$*T) from the beginning of each MPDCCH search space period.

The parameters N and Δ may be configured by higher layer.

Alternatively, the parameter Δ may be configured by higher layer while the parameter N may be configured in one of the following manners:

The parameter N indicates the number of MPDCCH search space periods during which the DCI(s) should be monitored. As the parameter Δ already indicates the first MPDCCH search space period in which the DCI(s) should be monitored, it is enough to indicate the last MPDCCH search space period in which the DCI(s) should be monitored. Therefore, it is enough to indicate when (in which MPDCCH search space period) the MPDCCH monitoring should be stopped.

Manner 1: N is determined by a control signal. For example, one bit in the control signal (e.g. DCI) indicates that the MPDCCH monitoring should be stopped. Otherwise, N is determined by a predefined maximal value $N_0$. For example, UE starts to monitor the MPDCCH after an offset (Δ*T) within the period of $T_0$ ($T_0$=M*T), then UE stops monitoring the MPDCCH till UE receives a control signal indicating the MPDCCH monitoring termination or UE monitors the MPDCCH up to $N_0$ T duration.

Manner 2: One of the unused states in a field of the control signal (e.g. DCI) indicates that the MPDCCH monitoring should be stopped. Otherwise, N is a predefined maximal value $N_0$. The manner 2 differs from manner 1 in that one of the unused states in a field of the control signal can be used, instead of one bit in the control signal, to indicate the MPDCCH monitoring termination.

Manner 3: N is determined by a time when the UE receives a number of DCIs scheduling uplink transmission and/or a number of DCIs scheduling downlink transmission before any uplink transmission or any feedback for downlink transmission expected to be received by eNB up to a maximal number within the period of $T_0$ ($T_0=M*T$). The maximum number may be for example 8.

Manner 4: N is determined by a control signal, wherein the control signal indicates the HARQ process number in corresponding DCI is equal to a predefined value (e.g., 8) and NDI field toggled. Otherwise, N is determined by a predefined maximal value $N_0$. For example, the control signal indicates that HARQ process number is equal to 8 and NDI field toggled (e.g., the TB is a new transmission), or HARQ process number is equal to the maximal HARQ process number and TB is a new transmission in the T0 period. For example, if HARQ process number equals to 8 and NDI field is not toggled (e.g., this TB is a retransmission), then HARQ process number equals to 7 and NDI field toggled (e.g., TB is a new transmission). 7 is the maximal HARQ process number except 8. So, this is the last scheduling in this T0 period, there is no MPDCCH monitoring after this scheduling.

Figure 4:
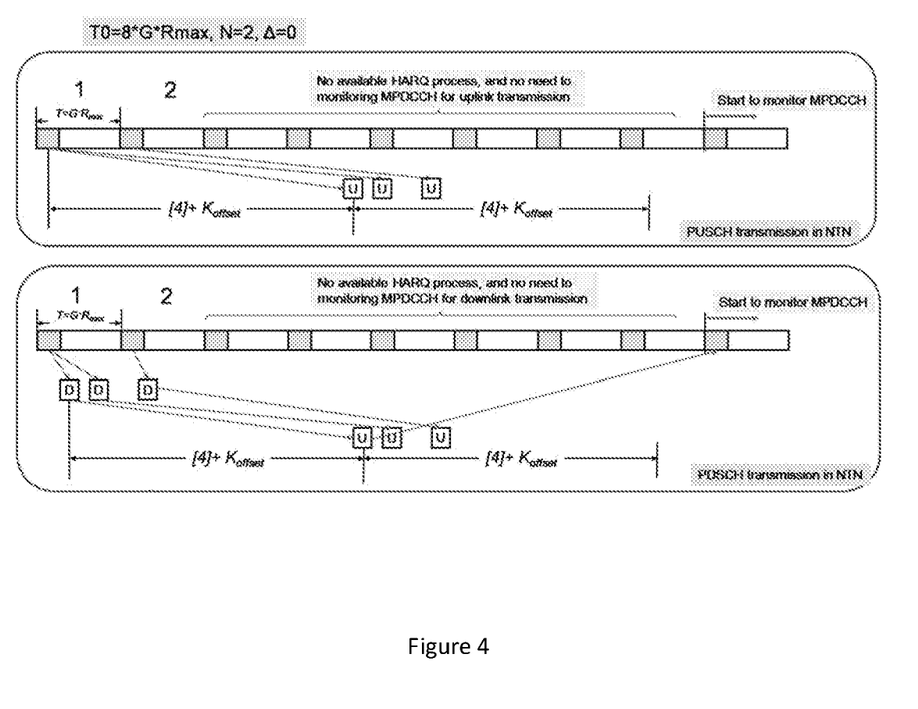
FIG. 4 illustrates an example of the third embodiment for both PUSCH transmission in NTN and PDSCH transmission in NTN.

Examples of the third embodiment are described as follows:

FIG. 4 illustrates an example of the third embodiment for both PUSCH transmission in NTN and PDSCH transmission in NTN. In the example of FIG. 4, M=8 ($T_0=8*G*R_{max}$), $\Delta=0$, N=2; the maximum HARQ process number is set to 3 for simplification.

As $\Delta=0$, the UE starts to monitor MPDCCH from the first MPDCCH search space period in the $T_0$ period. As N=2, the UE only monitors the first two MPDCCH search space periods (MPDCCH search space periods 1 and 2). Three (the maximum number) DCIs have been detected in the first two MPDCCH search space periods. Therefore, in the remaining (M−Δ−N=8−0−2=6) MPDCCH search space periods, there is no need to monitor MPDCCH for uplink or downlink transmission.

Figure 5:
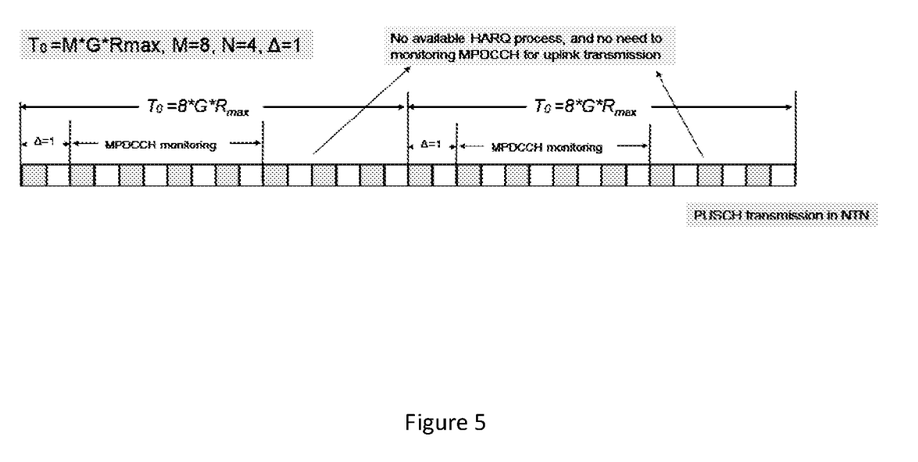
FIG. 5 illustrates another example of the third embodiment for PUSCH transmission in NTN.

FIG. 5 illustrates another example of the third embodiment for PUSCH transmission in NTN. In the example of FIG. 5, M=8 ($T_0=8*G*R_{max}$), $\Delta=1$, N=4.

It can be seen that the UE skips the first MPDCCH search space period (since $\Delta=1$), and starts to monitor MPDCCH in the second to the fifth MPDCCH search space periods (since N=4) within the period of $T_0$. In the last three MPDCCH search space periods in the $T_0$ period, there is no need to monitor MPDCCH for uplink transmission as no HARQ process number is available. The pattern of monitoring MPDCCH is repeated in the next $T_0$ period.

Figure 6:
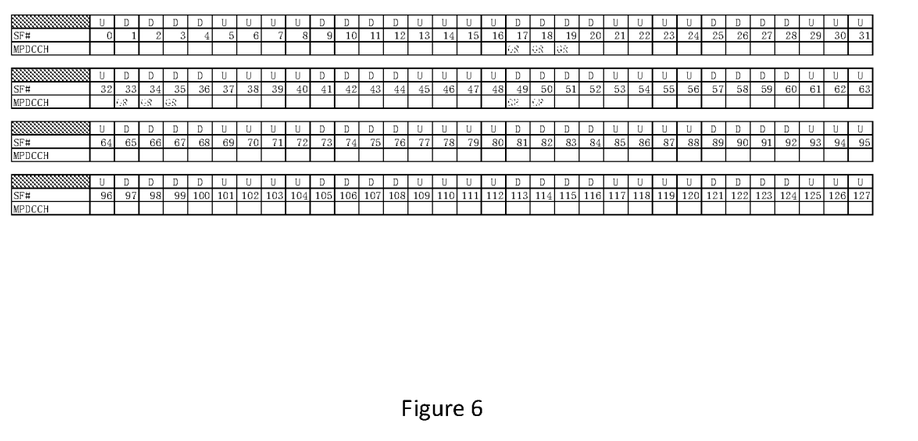
FIG. 6 illustrates yet another example of the third embodiment for PUSCH transmission in NTN.

FIG. 6 illustrate yet another example of the third embodiment for PUSCH transmission in NTN. In the example of FIG. 6, in the period $T_0=M*T$, M=8, $\Delta=1$, N=3; in each MPDCCH search space period ($T=G*R_{max}$), G=4, $R_{max}=4$, $\alpha_{offset}=1/16$. That is, there are 128 ($T_0=M*G*R_{max}=8*4*4$) subframes (subframe #0 to #127) in each $T_0$ period.

The UE does not monitor the MPDCCH in the first MPDCCH search space period ($\Delta=1$) (i.e. subframes #0 to #15).

The UE monitors the MPDCCH for the next consecutive three (i.e. N=3) MPDCCH search space periods (i.e. subframes #16 to #63).

The UE does not monitor the MPDCCH in the last four (i.e. M−Δ−N=8−1−3=4) MPDCCH search space periods (i.e. subframes #64 to #127).

In each of the MPDCCH search space periods in which MPDCCH is monitored, the UE only monitors a MPDCCH monitoring duration which equals to $R_{max}$ (=4) subframes. The starting subframe of each MPDCCH monitoring duration is indicated by $\alpha_{offset}*T$ (=1/16*4*4=1). For example, in the first MPDCCH search space period (i.e. the second MPDCCH search space period within the period $T_0$, in consideration of $\Delta=1$ which means that the first MPDCCH search space period is not monitored) (i.e. subframes #16 to #31), the starting subframe of the first MPDCCH monitoring duration (subframe #17) is calculated by adding the starting subframe of the monitored MPDCCH search space period (subframe #16 for the first monitored MPDCCH search space period) and the offset "$\alpha_{offset}*T$" which is 1 subframe. The first MPDCCH monitoring duration will be subframes #17 to #20 ($R_{max}=4$ subframes). In FIG. 6, three DCIs (shown as "GR" in FIG. 6) are detected in the first MPDCCH monitoring duration (i.e. in subframes #17, #18 and #19).

Similarly, the second MPDCCH monitoring duration is subframes #33 to #36, in which three DCIs are detected in subframes #33, #34 and #35; and the third MPDCCH monitoring duration is subframes #49 to #52, in which two DCIs are detected in subframes #49 and #50.

It can be seen that the UE monitors the MPDCCH in three MPDCCH monitoring durations, each of which has 4 (=$R_{max}$) subframes and starts from subframes #17, #33 and #49, respectively. In each of the $T_0$ period (a first period), the first starting subframe (#17) is calculated from the first subframe (#0) of the $T_0$ period (the first period) by adding $\Delta*T$ (that is a first offset, which is 16 subframes in FIG. 6) and $\alpha_{offset}*T$ (that is a second offset, which is 1 subframe in FIG. 6). It can be seen that both the first offset and the second offset are in unit of MPDCCH search space period T (that is a second period).

The UE monitors the MPDCCH only in a search window of the $T_0$ period (i.e. N consecutive MPDCCH search space periods). In the above example shown in FIG. 6, the search window is the second to the fourth MPDCCH search space periods (the first to the third monitored MPDCCH search space periods).

Figure 7:
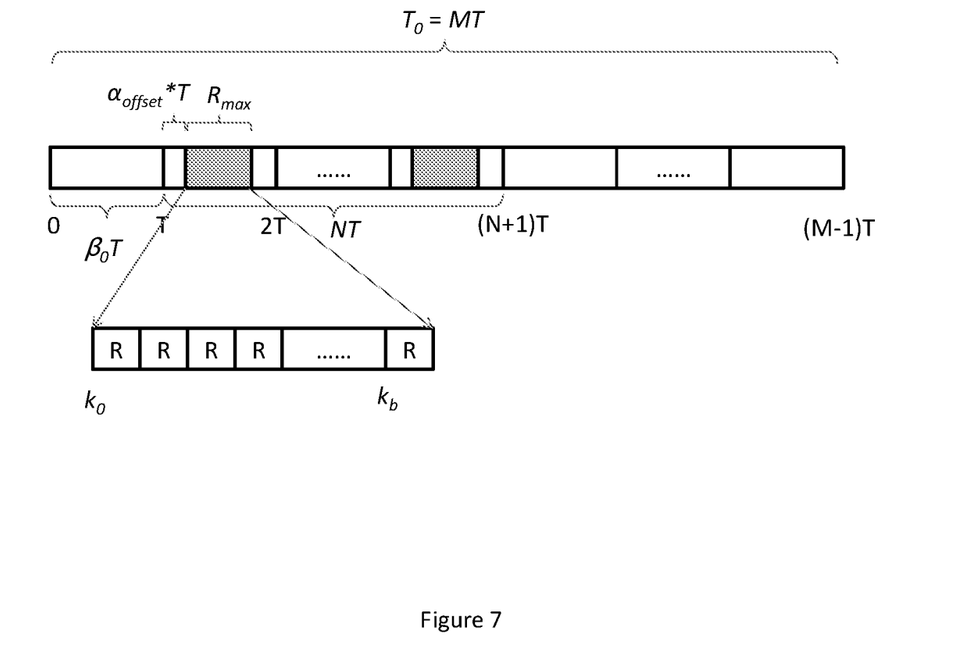
FIG. 7 illustrates an example of the locations of MPDCCH monitoring durations in the $T_0$ period.

FIG. 7 illustrates an example of the locations of MPDCCH monitoring durations in the $T_0$ period. As shown in FIG. 7, $\beta_0 T$ is the first offset of the start of the N consecutive MPDCCH search space periods from the start of the $T_0$ period. In each MPDCCH search space period (T), $\alpha_{offset}*T$ is the second offset of the start of the MPDCCH monitoring duration (with $R_{max}$ subframes) from the start of each MPDCCH search space period (T).

According to the third embodiment, the locations of the starting subframe k for each monitored MPDCCH search space period (T) in the $T_0$ period are given by k=$k_b$, where $k_b$ is the $b^{th}$ consecutive DL subframe from subframe $k_0$, excluding subframes used for transmission of SI messages, and b=u·R, and $$u = 0,1, \ldots \frac{R_{max}}{R} - 1,$$

R is the MPDCCH repetition number for blind detection, and where subframe $k_0$ of each monitored MPDCCH search space period (T) is a subframe satisfying the condition $(10n_f+\lfloor n_s/2 \rfloor) \bmod T_0 = \beta T + \lfloor \alpha_{offset} T \rfloor$, where $T=G·R_{max}$, $T \geq 4$. $T_0=MT$, $\beta \in Z | \beta_0 \leq \beta \leq \beta_0+N-1$; M, N and $\beta_0$ are configured by higher layer. Incidentally, $\beta_0$ is the above-mentioned $\Delta$.

Figure 8:
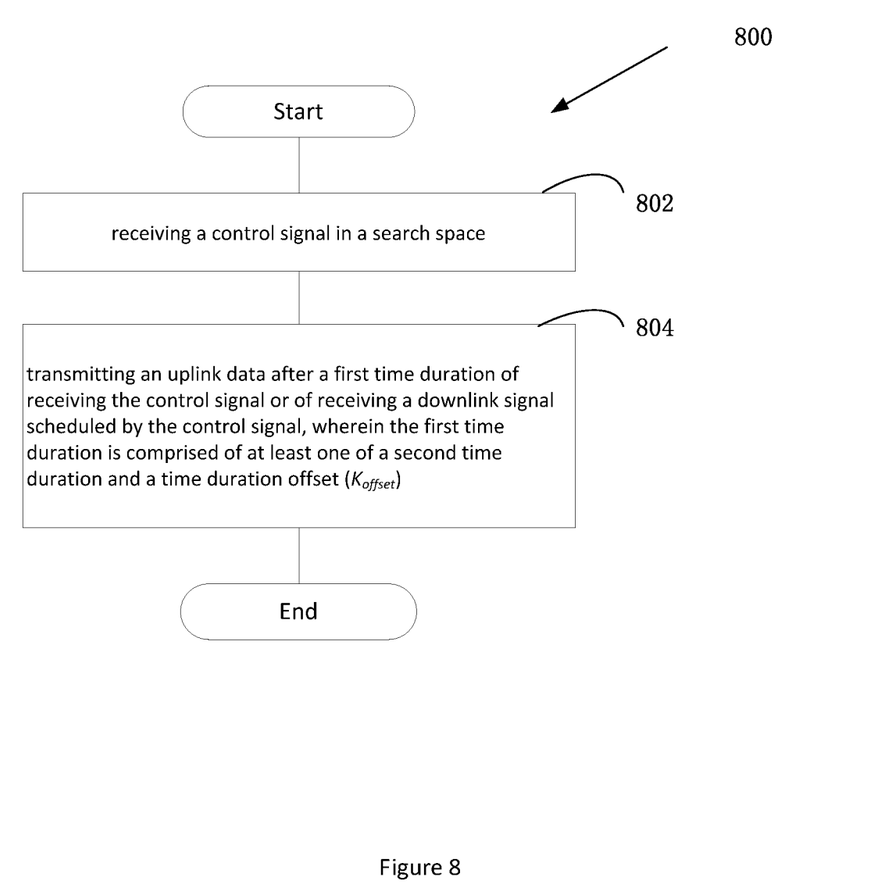
FIG. 8 is a schematic flow chart diagram illustrating an embodiment of a method.

FIG. 8 is a schematic flow chart diagram illustrating an embodiment of a method 800 according to the present application. In some embodiments, the method 800 is performed by an apparatus, such as a remote unit. In certain embodiments, the method 800 may be performed by a processor executing program code, for example, a microcontroller, a microprocessor, a CPU, a GPU, an auxiliary processing unit, a FPGA, or the like.

The method 800 may include 802 receiving a control signal in a search space; and 804 transmitting an uplink data after a first time duration of receiving the control signal or of receiving a downlink signal scheduled by the control signal, wherein the first time duration is comprised of at least one of a second time duration and a time duration offset ($K_{offset}$).

Figure 9:
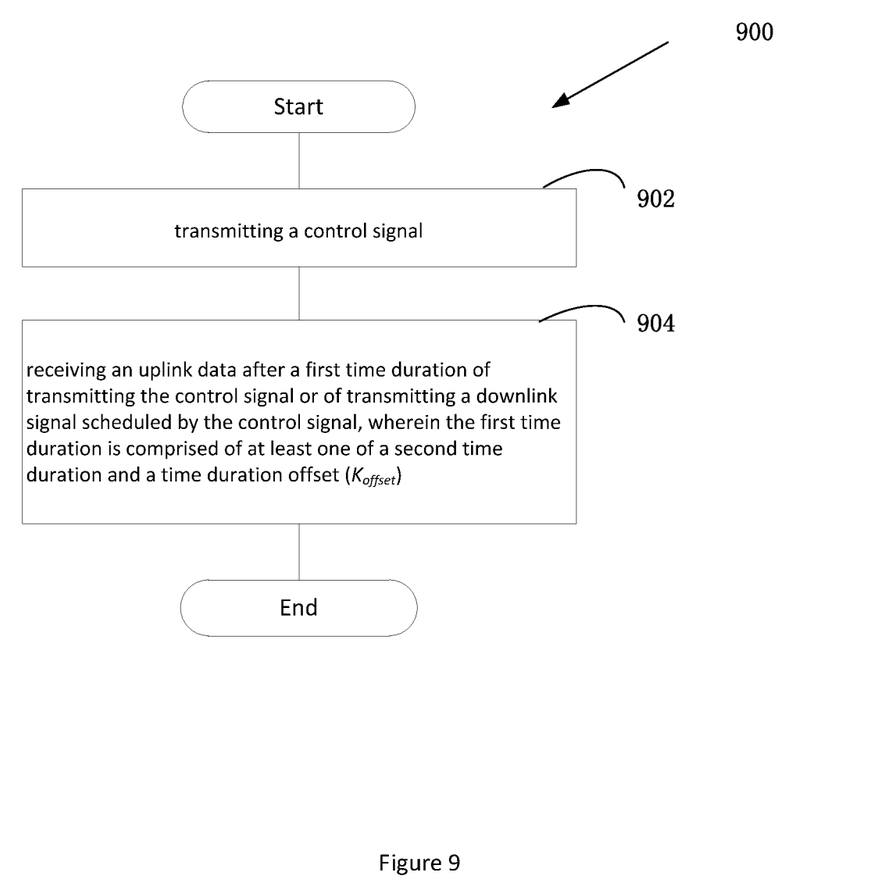
FIG. 9 is a schematic flow chart diagram illustrating another embodiment of a method.

FIG. 9 is a schematic flow chart diagram illustrating an embodiment of a method 900 according to the present application. In some embodiments, the method 900 is performed by an apparatus, such as a base unit. In certain embodiments, the method 900 may be performed by a processor executing program code, for example, a microcontroller, a microprocessor, a CPU, a GPU, an auxiliary processing unit, a FPGA, or the like.

The method 900 may include 902 transmitting a control signal in a search space; and 904 receiving an uplink data after a first time duration of transmitting the control signal or of transmitting a downlink signal scheduled by the control signal, wherein the first time duration is comprised of at least one of a second time duration and a time duration offset ($K_{offset}$).

Figure 10:
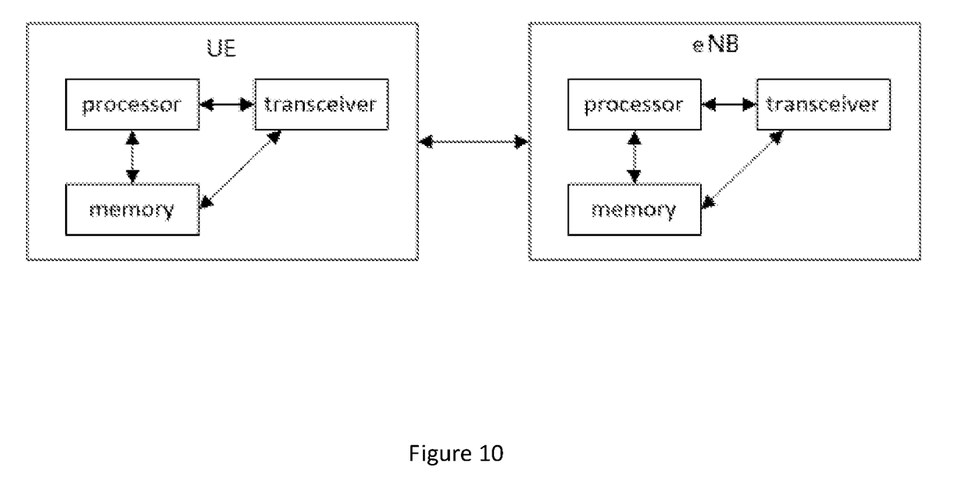
FIG. 10 is a schematic block diagram illustrating apparatuses according to one embodiment.

FIG. 10 is a schematic block diagram illustrating apparatuses according to one embodiment.

Referring to FIG. 10, the UE (i.e. the remote unit) includes a processor, a memory, and a transceiver. The processor implements a function, a process, and/or a method which are proposed in FIG. 8. The eNB (i.e. base unit) includes a processor, a memory, and a transceiver. The processor implements a function, a process, and/or a method which are proposed in FIG. 9. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a control signal in a search space;
   transmitting an uplink data after a first time duration of receiving the control signal or of receiving a downlink signal scheduled by the control signal, wherein the first time duration is comprised of at least one of a second time duration and a time duration offset ($K_{offset}$); and
   monitoring the control signal from a starting time slot, the starting time slot is determined by at least one of a first offset ($\Delta * T$) in a first period ($T_0$) and a second offset ($a_{offset} * T$) in a second period (T), and the first period ($T_0$) is configured by a high layer with unit of the second period.

2. The method of claim 1, wherein, the time duration offset is multiple of 10 ms or 40 ms.

3. A user equipment (UE) for wireless communication, comprising:
   at least one memory;
   at least one processor coupled with the at least one memory and configured to cause the UE to:
   receive a control signal in a search space;
   transmit an uplink data after a first time duration of receiving the control signal or of receiving a downlink signal scheduled by the control signal, wherein the first time duration is comprised of at least one of a second time duration and a time duration offset ($K_{offset}$); and
   monitor the control signal from a starting time slot, the starting time slot is determined by at least one of a first offset ($\Delta * T$) in a first period ($T_0$) and a second offset ($a_{offset} * T$) in a second period (T), and the first period ($T_0$) is configured by a high layer with unit of the second period.

4. The UE of claim 3, wherein the time duration offset is multiple of 10 ms or 40 ms.

5. The UE of claim 3, wherein the time duration offset is determined by a valid subframe pattern.

6. The UE of claim 3, wherein the time duration offset is a smallest integer multiple of 10 ms or 40 ms value that is equal to or larger than a preconfigured value.

7. The UE of claim 3, wherein the time duration offset is configured from an offset set determined by a valid subframe pattern.

8. The UE of claim 3, wherein the search space is configured by a scaling factor ($G_0$) and a maximum number ($R_{max}$), the scaling factor is determined by at least one of the time duration offset ($K_{offset}$), the maximum number ($R_{max}$), a preconfigured number, a type of satellite.

9. The UE of claim 3, wherein the first offset ($\Delta * T$) is configured by a high layer with unit of the second period (T).

10. The UE of claim 3, wherein the first period ($T_0$) is determined by a first number (M) and the second period (T), wherein, the first number (M) is configured by higher layer signaling.

11. The UE of claim 3, wherein the first offset ($\Delta*T$) is determined by a second number ($\Delta$) and the second period (T), wherein, the second number ($\Delta$) is configured by higher layer signaling.

12. The UE of claim 3, wherein the first period ($T_0$) is determined by the time duration offset ($K_{offset}$).

13. The UE of claim 3, wherein the search space includes a search window (N*T) in the first period ($T_0$).

14. The UE of claim 13, wherein the search window is configured by a high layer with unit of the second period (T).

15. The UE of claim 3, wherein the search space is from the starting time slot to an end time slot, wherein the end time slot is determined according to at least one of a control signal indication and a third number of the control signal having been received.

16. The UE of claim 15, wherein the control signal indication includes at least one of one bit indication in the control signal, one unused states indication of the control signal, HARQ process number in the control signal being equal to a predefined value and NDI in the control signal being toggled in the first period.

17. A method performed by a base unit, the method comprising:
transmitting a control signal; and
receiving an uplink data after a first time duration of transmitting the control signal or of transmitting a downlink signal scheduled by the control signal, wherein the first time duration is comprised of at least one of a second time duration and a time duration offset ($K_{offset}$), wherein a starting time slot for monitoring the control signal is based on at least one of a first offset ($\Delta*T$) in a first period ($T_0$) and a second offset ($a_{offset}*T$) in a second period (T), and the first period ($T_0$) is configured by a high layer with unit of the second period.

18. A base unit for wireless communication, comprising:
at least one memory;
at least one processor coupled with the at least one memory and configured to cause the base unit to:
transmit a control signal; and
receive an uplink data after a first time duration of transmitting the control signal or of transmitting a downlink signal scheduled by the control signal, wherein the first time duration is comprised of at least one of a second time duration and a time duration offset ($K_{offset}$), wherein a starting time slot for monitoring the control signal is based on at least one of a first offset ($\Delta*T$) in a first period ($T_0$) and a second offset ($a_{offset}*T$) in a second period (T), and the first period ($T_0$) is configured by a high layer with unit of the second period.

19. The base unit of claim 18, wherein the time duration offset is multiple of 10 ms or 40 ms.

20. The base unit of claim 18, wherein the time duration offset is determined by a valid subframe pattern.

* * * * *